United States Patent
Arvidsson et al.

(10) Patent No.: US 6,510,882 B1
(45) Date of Patent: Jan. 28, 2003

(54) SWIVEL CONNECTION FOR CONTROLLING OF THE AIR PRESSURE IN A TIRE FOR A VEHICLE

(75) Inventors: Sören Arvidsson, Eskilstuna (SE); Anders Lindell, Jönåker (SE)

(73) Assignee: Innovationssupport AB, Eskilstuna (SE)

( * ) Notice: Subject to any disclaimer, the term of this patent is extended or adjusted under 35 U.S.C. 154(b) by 0 days.

(21) Appl. No.: 09/786,473

(22) PCT Filed: Sep. 9, 1999

(86) PCT No.: PCT/SE99/01574
§ 371 (c)(1),
(2), (4) Date: Mar. 5, 2001

(87) PCT Pub. No.: WO00/15451
PCT Pub. Date: Mar. 23, 2000

(30) Foreign Application Priority Data

Sep. 11, 1998 (SE) .............................................. 9803076

(51) Int. Cl.⁷ .............................................. B60C 23/00
(52) U.S. Cl. ..................................................... 152/417
(58) Field of Search ................................ 152/415, 416, 152/417

(56) References Cited

U.S. PATENT DOCUMENTS

| 4,434,833 | A | | 3/1984 | Swanson et al. | |
|---|---|---|---|---|---|
| 4,765,385 | A | * | 8/1988 | McGeachy | 152/416 |
| 4,932,451 | A | | 6/1990 | Williams et al. | |
| 5,203,391 | A | | 4/1993 | Fox | |
| 5,221,381 | A | * | 6/1993 | Hurrell, II | 152/416 |
| 5,398,743 | A | * | 3/1995 | Bartos | 152/416 |
| 5,868,881 | A | * | 2/1999 | Bradley | 152/417 |
| 5,979,526 | A | * | 11/1999 | Chamoy | 152/417 |

* cited by examiner

Primary Examiner—Russell D. Stormer
(74) Attorney, Agent, or Firm—Nixon & Vanderhye

(57) ABSTRACT

A swivel connection is provided for the regulation of air pressure in a tire of a vehicle. The connection includes first and second ring-shaped members concentrically arranged. The first ring-shaped member rotates with the tire while the second ring-shaped member is fixed to the vehicle. A duct communicates air between an air pressure unit and the interior of the tire via a conduit including an annular seal having circumferentially spaced holes for transmission of air to and from the tire. A ball bearing enables the relative rotation of the first and second ring-shaped members.

8 Claims, 3 Drawing Sheets

SWIVEL CONNECTION FOR CONTROLLING OF THE AIR PRESSURE IN A TIRE FOR A VEHICLE

TECHNICAL FIELD

The present invention relates to a swivel connection for the regulation of air pressure in a tire assembled on a rim of a vehicle wheel while the vehicle is in traffic comprising a first ring-shaped member fixedly connected with the rim and rotatable with the wheel of the vehicle when rotating around its hub, and a second ring-shaped member that does not rotate relative to the hub and that interacts with the first ring-shaped member. A ring-shaped duct is formed between the first and the second ring-shaped member and which duct is connected with the inner air-space in the tire and an air-pressure unit for regulation of the air pressure in the tire both when the vehicle is moving and when it is not moving.

BACKGROUND OF THE INVENTION

Correct tire pressure is and has been important for road holding abilities. To change the tire pressure in the conventional way, that is to increase the air pressure by means of a stationary air compressor or to deflate the tire manually is not a practical way when the need for pressure regulation changes at short intervals. Several solutions to solve this problem therefor have been presented. Here it is assumed that the wheel is rotating on a hub having bearings and encloses a driving axle for the wheel. Those solutions have in common that a swivel connection is arranged in connection with the hub and compressed air is fed into the tire or the tire is deflated via a duct in the hub that is in connection with a ring-shaped duct extending between the hub and the rim that carries the tire. The hub and rim therefor have to be provided with this swivel connection already when constructing the wheel system. Examples of such contructions are known, e.g., from U.S. Pat. Nos. 3,705,614 and 5,203,391. A solution that differs somewhat from those is known from U.S. Pat. No. 2,017,158 where the wheel is fixedly assembled on an axle that in turn is rotary in a bearing and where the swivel connection is arranged between the hub and a brake drum belonging to the wheel.

None of the known solutions enables the swivel connection to be assembled afterwards on a vehicle wheel nor do they admit that the movement of the wheel differs materially from its ideal travel.

BRIEF SUMMARY OF THE INVENTION

The object of the present invention is to achieve a swivel device to be assembled afterwards on different types of vehicle wheels and which enables regulation of the tire pressure even when the vehicle is moving and that is insensitive to deviations from the ideal rotation of the wheel, that is, insensitive to a possible eccentricity in the movement of the rim or deviation from the ideal plane of rotation transversely to the direction of axis of the hub. The object is achieved with a swivel device according to the present invention wherein the second ring-shaped member is connected with the first ring-shaped member via a bearing and is prevented from rotation around the hub by means of a holder fixed to the vehicle. Preferably the holder is elastically connected with the second ringshaped member in order to be able to take up the mentioned deviations in the rotation of the wheel. The holder is assembled on the hub by means of a clamping device that is adaptable for different types of hubs. The first ring-shaped member may be rotary in relation to the second ring-shaped member, for instance via a ball bearing comprising balls that are held apart by distance members. The two interacting rings in this embodiment are held together by means of a clamp ring that also is part of the bearing race of the ball bearing. On each side of the fixed ring and spaced radially from one another are seal joints to prevent dirt and water from penetrating into the ball bearing.

In a preferred embodiment, the first ring-shaped member is a rotary ring having a U-shaped cross section that forms a ring-shaped duct, which is open in a direction towards the vehicle chassis and that is connected with the tire via a conduit, and the second ring-shaped member is a fixed ring arranged in the duct and sealing it. A conduit for feeding compressed air to raise the tire pressure or for deflation in order to lower the tire pressure is connected with a case that is arranged on the second ring-shaped member and is connected with an air duct that extends through the second ring-shaped member to the ring-shaped duct. The feed duct ends in a ring-shaped slot in the second ring-shaped member which carries a ring-shaped seal that extends into the ring-shaped duct. The seal is provided with circumferentially equally spaced holes through which air can pass to the ring-shaped duct.

It lies within the scope of the invention to vary the embodiment of the two ring-shaped members within broad limits. For instance, the ring-shaped duct may be formed in the second, fixed ring-shaped member instead of in the first, rotary member. The holder that prevents the rotation of the second, fixed member may be placed on other parts of the vehicle chassis than the hub.

Further features and characteristics concerning the present invention are evident from the description of the drawings below and from the claims.

BRIEF DESCRIPTION OF THE DRAWING FIGURES

The invention is described below as an example of an embodiment in connection with the enclosed drawings.

DETAILED DESCRIPTION OF THE INVENTION

Figure 1:
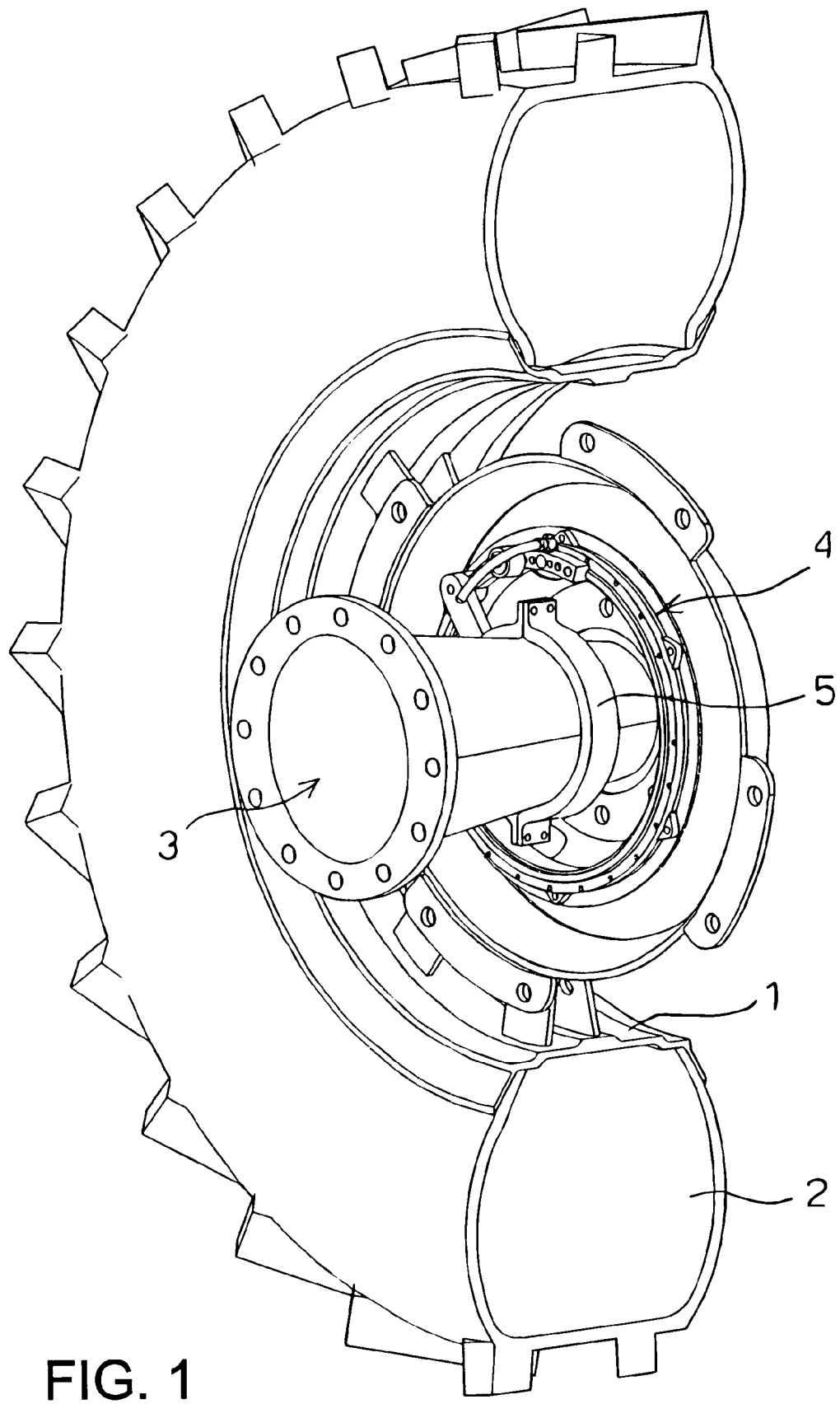
FIG. 1 illustrates a wheel of a vehicle assembled on a hub seen from the chassis and outwards to the hub and partly cut and provided with a ring-shaped swivel connection according to the invention.

The wheel shown in FIG. 1 comprises a wheel rim 1 that carries a tire 2 of rubber assembled via conventional bearings, not shown, on a hub 3 that, in turn, is fixedly connected with the vehicle chassis. A swivel connection 4 according to the invention is assembled on the inside of the rim 1 and is connected with the interior air space in the tire 2, and a compressed air or an air-pressure unit 6.5 comprising among other things a compressor with a pressure vessel belonging to it and electrically operated valves for the regulation of the tire pressure. The compressed air unit is per se conventional.

Figure 2:
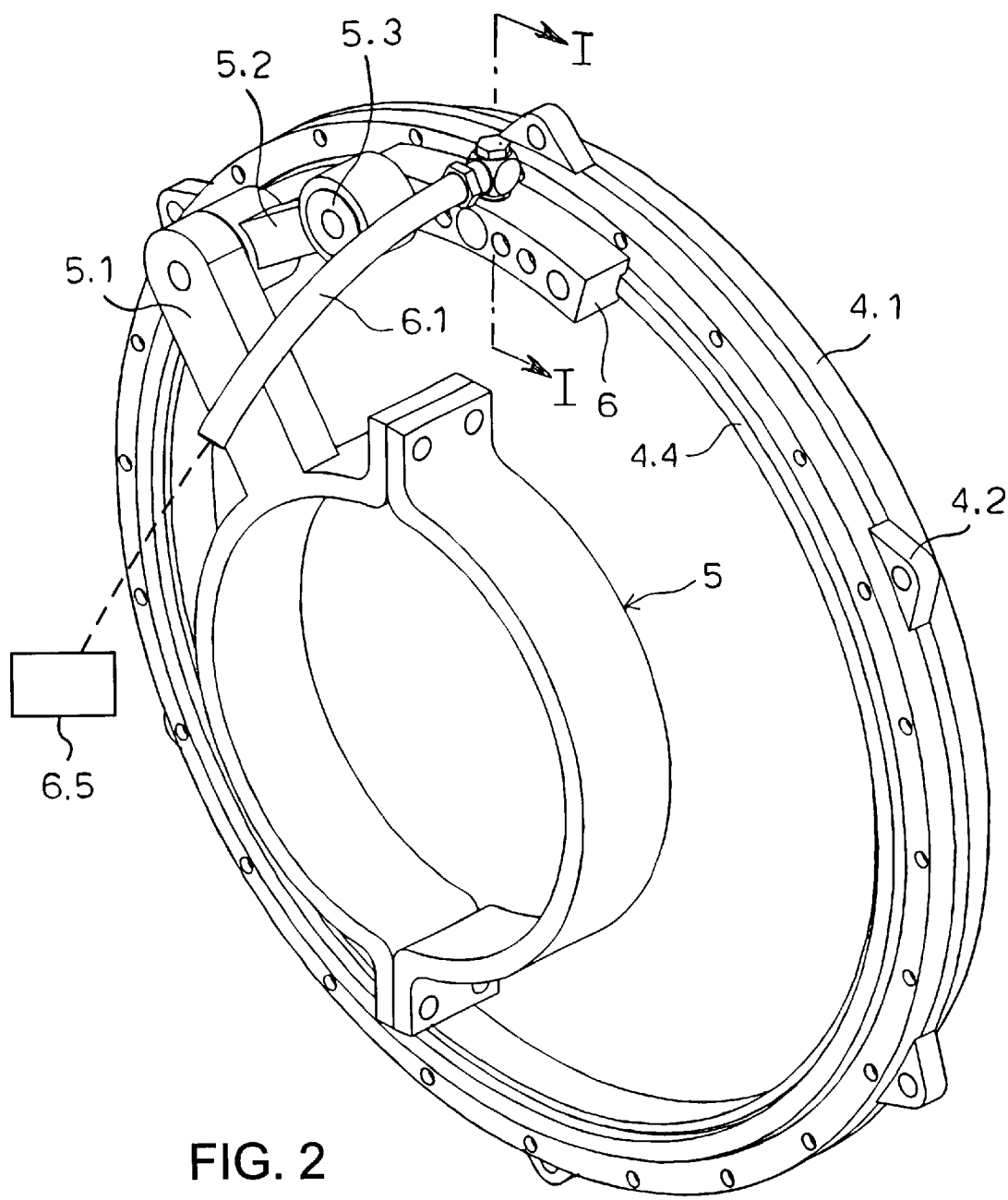
FIG. 2 illustrates the swivel connection separately as viewed in the same direction as in FIG. 1.
Figure 3:
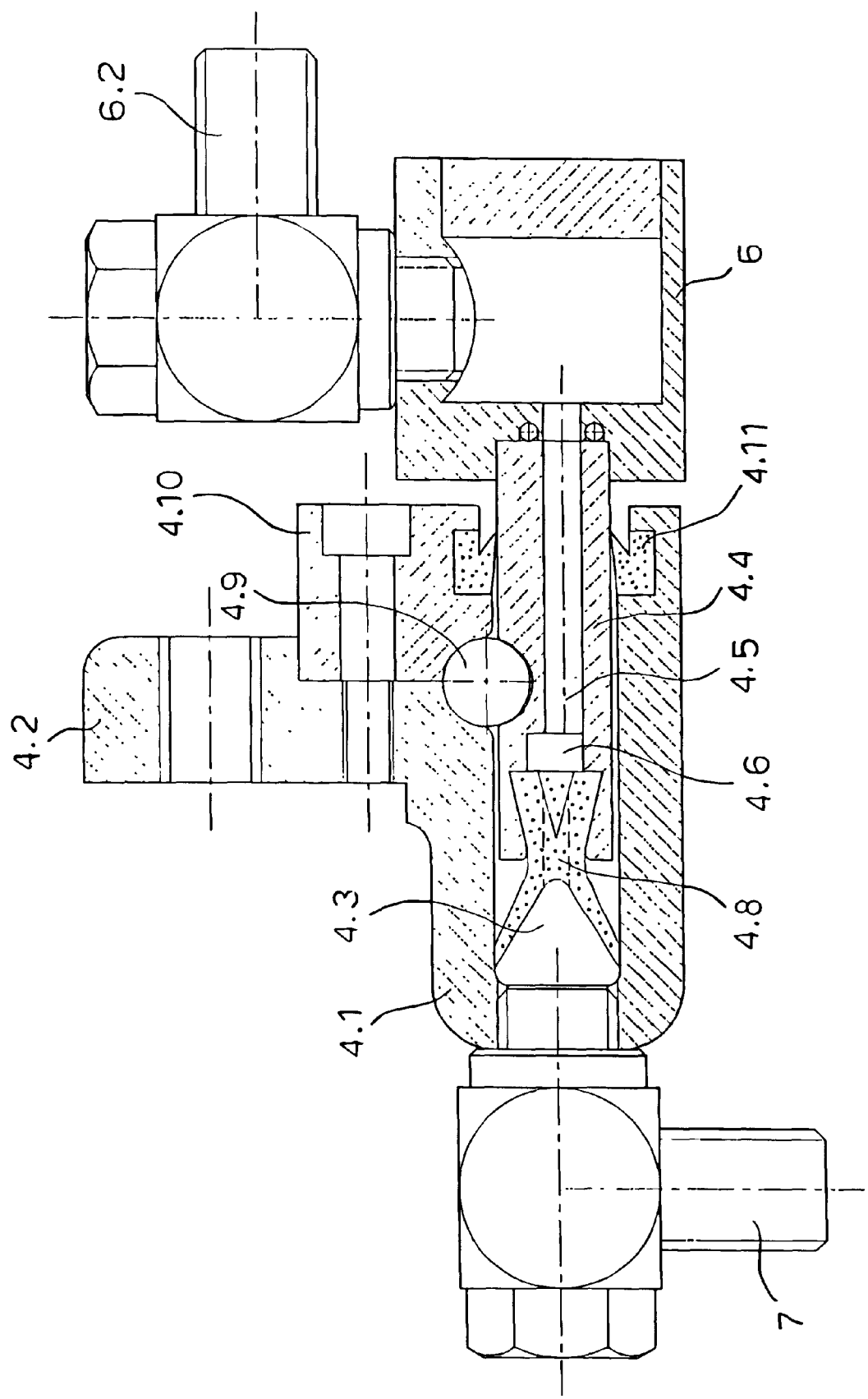
FIG. 3 illustrates a cross-section through the swivel connection along line I—I in FIG. 2.

The swivel connection 4, shown in detail in FIGS. 2 and 3, comprises a ring 4.1, rotary with the wheel, and is fixed to the rim 2 with screws via braces 4.2. The rotary ring 4.1 has a U-shaped cross section that constitutes a ring-shaped duct 4.3 which opens in a direction towards the vehicle chassis and that is connected with the tire 2 via a conduit, not shown in the drawing figures. A fixed ring 4.4 is arranged in the duct 4.3 in the rotary ring 4.1 and is connected to a holder 5, fixedly assembled on the hub 3, whereby it is prevented from rotating with the rotary ring 4.1 when the ring rotates with the wheel concerned. The holder 5 is in two pieces and gets clamped to the hub 3 by means of clamping screws, not shown in the figures. The holder 5 carries a radial protruding arm 5.1 that in turn is connected with the fixed ring 4.4 via a connecting case 6 and a slewing bracket 5.2 having rubber bushings 5.3 that are able to elastically take up deviations in movements of the rotary ring 4.1. Those deviations may, for example, include eccentric movements around the hub 3 or deviation from the ideal plane of rotation perpendicular to the hub 3.

A conduit 6.1 for feeding compressed air to the tire in order to raise the air pressure in tire 2 or for deflation of the tire in order to lower its air pressure is connected with a case 6 via a coupling 6.2. Case 6 is connected with an air duct 4.5 that extends through the fixed ring 4.4 to the ring-shaped duct 4.3 in the rotary ring 4.1. The feed duct 4.5 ends in a ring-shaped slot 4.6 in the fixed ring 4.4 that carries a ring-shaped seal 4.8. Seal 4.8 extends into the ring-shaped duct 4.3 in the rotary ring 4.1 and provided with a number of circumferentially equally spaced holes through which air can pass to the ring-shaped duct 4.3.

The rotary ring 4.1 rotates in relation to the fixed ring 4.4 on the ball bearing 4.9. Ball bearing 4.9 comprises balls that are kept art by distance members for instance formed of plastics, not shown in the drawing figures. The two interacting rings 4.1, 4.4 are held together by means of a clamp ring 4.10 that also is part of the bearing race in the ball bearing application 4.9. Two seal joints 4.11 are arranged on each side of the fixed ring and are spaced radially from one another to prevent penetration of dirt and water into the ball bearing. FIG. 3 also shows an inlet plug 7 for a conduit, not shown in the figures that is connected with the air space of the tire 2.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A swivel connection for the regulation of air pressure in a tire assembled on a rim of a wheel of a vehicle comprising:
    a first ring-shaped member for fixed connection with the wheel rim and rotation with the wheel of the vehicle when rotating around a hub fixed to the vehicle;
    a second ring-shaped member non-rotationally fixed to the hub for interacting with the first ring-shaped member;
    a ring shaped duct formed between the first and second ring-shaped members for connection with air space in the tire and an air pressure unit for regulation of the air pressure in the tire;
    said second ring-shaped member being connected with the first ring-shaped member by a ball bearing cooperable therebetween and prevented from rotation about the hub by a holder fixedly connected to the vehicle.

2. A swivel connection according to claim 1 wherein the holder is elastically connected to the second ring-shaped member.

3. A swivel connection according to claim 1 wherein the holder is assembled on and fixed to the hub.

4. A swivel connection according to claim 1 wherein said first ring-shaped member comprises a rotary ring having a generally U-shaped cross-section forming a ring-shaped duct opening in a direction towards a chassis of the vehicle, said duct being connected with the tire via a conduit, said second ring-shaped member comprising a fixed ring arranged in the duct, and a seal in the duct between the first and second ring-shaped members.

5. A swivel connection according to claim 1 including a conduit connected with said air pressure unit for feeding compressed air to the tire for raising the air pressure in the tire or deflating the tire in order to lower the air pressure in the tire, said conduit being connected with a case disposed on said second ring-shaped member, said case being connected with an air conduit extending through said second ring-shaped member in communication with said ring-shaped duct.

6. A swivel connection according to claim 5 wherein said second ring-shaped member includes a feed duct terminating in a ring-shaped slot, a ring-shaped seal carried by said second ring-shaped member extending into said ring-shaped duct and having a plurality of circumferentially spaced holes therealong for flowing air into the ring-shaped duct.

7. A swivel connection according to claim 1 wherein the first and second ring-shaped members are held together by a clamp ring, said clamp ring forming part of a bearing race for said ball bearing.

8. A swivel connection according to claim 1 including a pair of sealing joints radially spaced from one another and respectively along each side of the second ring-shaped member to seal against penetration of dirt and water into the ball bearing.

* * * * *